Oct. 28, 1952     W. L. CARLSON     2,615,944

DYNAMOELECTRIC MACHINE

Filed Jan. 6, 1951     2 SHEETS—SHEET 1

INVENTOR
WILBUR L. CARLSON

Willits, Hardman & Fehr
HIS ATTORNEYS

Oct. 28, 1952      W. L. CARLSON      2,615,944
DYNAMOELECTRIC MACHINE

Filed Jan. 6, 1951      2 SHEETS—SHEET 2

INVENTOR
WILBUR L. CARLSON
By Willits, Hardman & Fehr
HIS ATTORNEYS

Patented Oct. 28, 1952

2,615,944

UNITED STATES PATENT OFFICE 2,615,944

DYNAMOELECTRIC MACHINE

Wilbur L. Carlson, Rochester, N. Y., assignor to General Motors Corporation, Detroit, Mich., a corporation of Delaware Application January 6, 1951, Serial No. 204,755

3 Claims. (Cl. 172—278)

This invention relates to dynamo electric machines and more particularly to an improved arrangement of wedge members for holding the windings in the winding slots and for supporting the end turns of the windings outside the slots.

An object of the present invention is to provide an improved dynamo electric machine construction.

Another object of the invention is to provide an improved arrangement of dynamo electric machine slot wedge members. The above objects are accomplished by the use of different wedge members having means to hold certain windings in certain slots and having certain wedge members having means to support the end turns of windings outside the slots.

Further objects and advantages of the present invention will be apparent from the following description, reference being had to the accompanying drawings wherein a preferred embodiment of the present invention is clearly shown.

Figure 1:
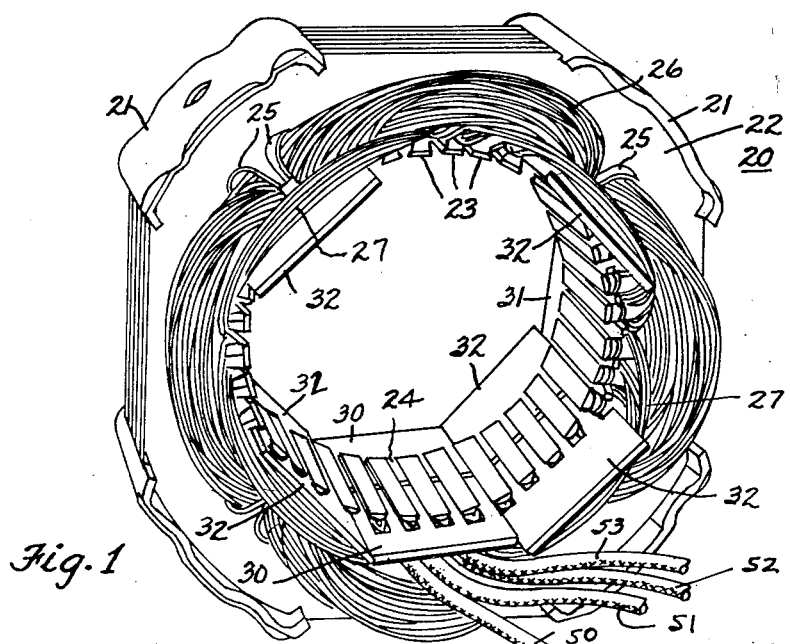
Fig. 1 is a perspective view of a stator for a dynamo electric machine illustrating the improved arrangement of slot wedge members of this invention.
Figure 5:
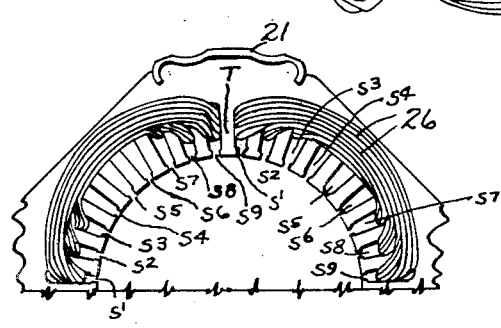
Fig. 5 shows a fragmentary portion of a stator showing coils positioned in certain slots.

Referring to the drawings, 20 designates a stationary element or stator for a dynamo electric machine which may be formed of a plurality of thin laminations held together by plates 21 welded to the periphery of the laminations. The stator comprises a yoke portion 22 having teeth 23 projecting radially inward therefrom to provide a plurality of coil winding slots 24. The slots 24 are provided with slot liners 25 of insulating material. As shown in Fig. 1, certain slots are shown containing superimposed layers of coil sides of insulated running windings 26 and certain slots contain both coil sides of running windings 26 and starting windings 27, and certain slots contain only starting windings.

In order to hold the winding in place and at the same time close the slots a plurality of slot wedge members 30, 31 and 32 are placed in certain slots over the windings. These members are punched from sheet insulating material. Each of the slot wedge members is a single unitary structure. The wedge member 30 includes a plurality of relative short wedge or fingers 35 and a relative wide transverse portion 36 joining the wedges at one end. The wedge member 31 includes a plurality of relative long wedges or fingers 37 and a relative narrow transverse portion 38. The wedge member 32 is of T-shape formation and includes wedges 39 or fingers and includes a relative wide transverse portion 40. The member 32 in this instance has one less wedge than the members 30 and 31. It is pointed out that while the wedge members 30 and 31 are shown as having five slot wedges or fingers and wedge member 32 is shown as having four slot wedges or fingers it is to be understood that any number of wedges could be provided. The end of the fingers are pointed so as to facilitate insertion of the fingers in the slots.

It will be noted that the members 30, 31 and 32 are flat and that the side edges of transverse portions 36, 38 and 40 are straight longitudinally. When the wedges are arranged in the slots the straight edges of adjacent transverse portions will be in abutting relation to lock each other in position with the transverse portion 40 of members 32 forming supports for the end turns of the coils 27.

Figures 2, 3, 4:
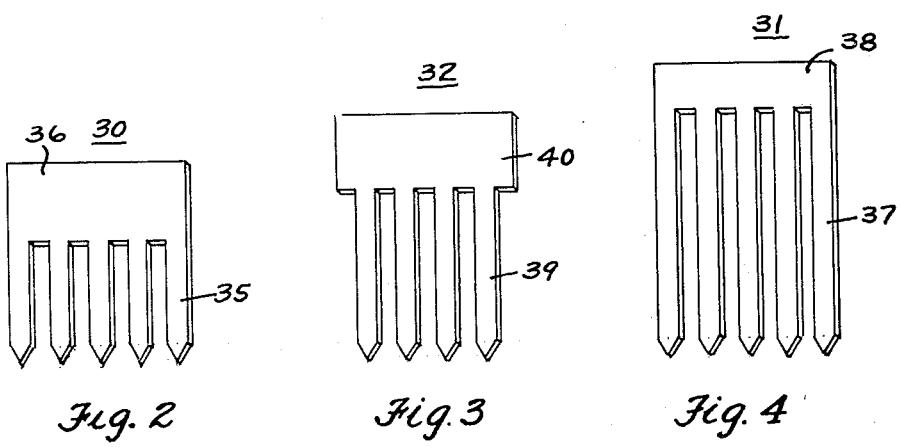
Figs. 2 and 3 and 4 are detailed views of the wedge members used in the present invention shown in Fig. 1.

In order to provide the stator structure 20 as shown in Fig. 1, the laminated core is first supported in a winding machine. As indicated in Fig. 2, the slots of the core are divided in four groups, each group having slots $s1$ to $s9$ inclusive separated by a tooth T. In each group of slots there is wound a running winding 26 wound from a continuous conductor wire. The four groups are wound simultaneously. The running windings are first wound in slots marked $s1$, $s2$ and $s3$ and slots $s6$, $s8$ and $s9$. In forming each running winding from a continuous conductor, a predetermined number of turns are first wound in the slots $s3$ and $s7$ and then continued in slots $s2$ and $s8$ until the desired number of coils are wound, and then the conductor is finally wound in slots $s1$ and $s9$ to provide the predetermined desired number of turns. The winding machine is then stopped.

In order to hold the winding in the slots a T-shaped wedge member 32 is inserted at opposite ends of stator core in a manner so that two wedges 39 close $s8$ and $s9$ in one group and two wedges close slots $s1$ and $s2$ of another group. The slots $s1$ and $s3$ of each group which have only a few layers of windings $s6$ are not closed by wedges 39. It will be noted that the transverse portion 40 of each wedge member 32, four in number in the present instance, extend a substantial distance from the ends of the stator. After the wedge members are in position to maintain the running winding 26 in position the starting windings are first wound in the slots, certain slots namely s7 of one group and s3 of another group, and then continuing in slots s6 and s4 finishing in slots s5 and s5 of each group. As the starting winding is moved from one slot of one group to a slot in another group the end turns of the starting winding extend over the transverse portions 40 for the purpose of supporting the end turns of the starting windings 27 both during and subsequent to the winding operation.

Figure 6:
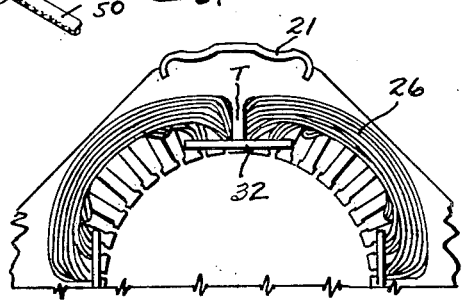
Fig. 6 is a view similar to Fig. 5 illustrating the use of a wedge member shown in Fig. 2.
Figure 7:
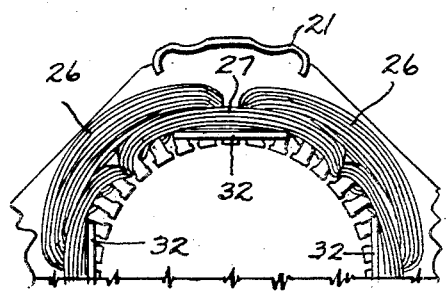
Fig. 7 is a view illustrating coils in other slots with their end turns supported on the ledge of the wedge member shown in Fig. 2.
Figure 8:
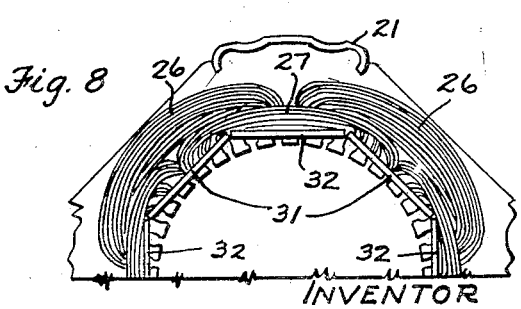
Fig. 8 is a view showing a shorter wedge shown in Fig. 7, disposed between two long wedges and in abutting relation.
Figure 9:
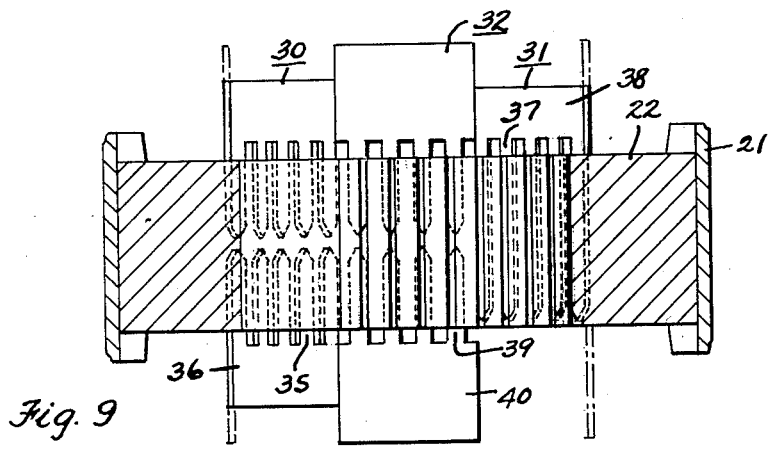
Fig. 9 is a sectional view through the stator illustrating the relative positions of the wedges shown in Figs. 2 and 3 and 4.

After the starting winding operations are completed one end of the various windings are connected together in pairs in the corrected relationship in any suitable manner. In the present instance each pair of wires to be connected are inserted in a steel clip not shown. The sleeve with the wire end therein is then placed between the jaws of an electric spot-welder. When current is passed through the clip and wire ends of the conductors, this causes the conductor ends to fuse together and to the steel clips. Since the melting point of conductors is much less than the clip the clip does not melt. After the conductor ends are fused together the joint is dipped in a hot plastic compound for insulation. In a similar manner see Fig. 1, the external leads 50, 51, 52 and 53 of the machine, shown in Fig. 1, are connected to the winding ends. These external leads lie in slots containing the sides of the starting windings. The slots containing the external leads are held therein by a pair of wedge members 30, inserted at opposite ends of the stator as clearly shown in Fig. 6. The other slots containing the starting winding are closed by wedge members 31 which are inserted from one end of the stator core with the wedges 39 extending approximately the full length of the slots as shown in Fig. 9. Fig. 9 does not show the windings in the slots but it does show the approximate relation of the three different wedge members 30, 31, and 32 after they have been assembled with the stator core with the windings in their respective slots. The width of each wedge member is such that they will frictionally engage the walls of their respective slots. The friction of the wedges against the walls of the slots hold the wedges firmly in place and also hold firmly the winding in the slots so that individual wires cannot creep past the wedges into the air gap of the machine. When the wedges are positioned in the slots the longitudinal straight sides of the adjacent transverse portion of the wedge members will be in abutting relation at one end of the stator core to lock the wedge members against sidewise movements.

It will be apparent that this improved construction and the method of making same provides not only a reliable construction but also a construction which is cheaper to build and neat in appearance.

While the embodiment of the present invention as herein disclosed, constitutes a preferred form, it is to be understood that other forms might be adopted.

What is claimed is as follows:

1. A member for dynamo electric machines having a core provided with a plurality of slots, certain of said slots adapted to receive running coil windings and certain of said slots adapted to receive starting coil windings only and certain of said slots adapted to receive both running coil and starting coil windings; a first set of spaced flat wedge members including a plurality of slot wedge fingers for closing the slots containing only the running winding and holding said windings in place, said wedges having a flat web portion joining the finger at one end exterior to the said member, said web member supporting the end turns of the starting windings; a second set of flat wedge members including a plurality of slot wedge fingers for closing the remaining slots and holding the windings therein in place, each of said second set of wedge members having a web portion joining the fingers at one end of the member, all of said webs of said wedge members having longitudinally straight edges exterior to the said member, each straight edge being in frictionally abutting relationship with its adjacent straight edge whereby all wedge members are locked against sidewise movements.

2. A member for dynamo electric machines having a core provided with a plurality of slots adapted to receive running and starting coil windings; and means including a plurality of flat slot wedge members for closing the slots and holding the windings in place, said members including a plurality of flat wedges extending to the slots over said windings and a flat web portion formed integral with said slot wedges at one end, said web portions of alternate wedge members being of greater length so as to support the end turns of the starting coil windings, and each of said web portions having straight longitudinal edges in frictionally abutting relationship whereby said wedge members are locked in position to preclude sidewise movement between said wedge members.

3. A stator member for a dynamo electric machine having a plurality of winding slots formed therein; a group of running windings positioned in certain of said slots; a first set of flat wedge members for closing some of the slots containing running windings, each of said wedge members having a plurality of straight fingers extending over the windings in certain of said slots and holding said running windings in place and having web portions joining the fingers at one end exterior to said stator member, a group of starting windings positioned in the remaining slots and certain of the slots containing a running winding, said web portions of the first set of wedge members supporting the end turns of the starting windings; and a second set of flat wedge members for closing the slots containing the starting windings, each of said wedge members of the second set having a plurality of straight fingers extending over the starting windings and holding same in place and having a web portion joining the finger at one end exterior to said stator member, all of said web portion having longitudinal side edges in frictionally abutting relationship whereby all wedge members are locked in position.

WILBUR L. CARLSON.

REFERENCES CITED

The following references are of record in the file of this patent:

UNITED STATES PATENTS

| Number | Name | Date |
|---|---|---|
| 2,443,455 | Herman | June 15, 1948 |